United States Patent [19]

Mansfield

[11] 4,147,140

[45] Apr. 3, 1979

[54] CYLINDER HEAD COOLING ARRANGEMENT FOR INTERNAL COMBUSTION ENGINES

[75] Inventor: Wilfred P. Mansfield, Eastleigh, England

[73] Assignee: National Research Development Corporation, London, England

[21] Appl. No.: 807,146

[22] Filed: Jun. 16, 1977

[51] Int. Cl.² ............................. F01P 3/14; F01P 3/16
[52] U.S. Cl. .............................. 123/41.77; 123/41.85; 123/41.82 R
[58] Field of Search ................. 123/41.3, 41.57, 41.52, 123/41.28, 41.55, 41.76, 41.82 R, 41.77, 41.85

[56] References Cited

U.S. PATENT DOCUMENTS

| | | | |
|---|---|---|---|
| 2,012,512 | 8/1935 | Jagersberger | 123/41.77 X |
| 2,191,485 | 2/1940 | Jensen | 123/41.77 |
| 2,450,998 | 10/1948 | Sheppard | 123/41.77 |
| 2,600,529 | 6/1952 | Gregory | 123/41.85 X |
| 2,691,336 | 10/1954 | Flatz et al. | 123/41.77 X |
| 2,716,969 | 9/1955 | Lang | 123/41.85 X |
| 2,816,530 | 12/1957 | Kloss | 123/41.85 |
| 2,967,518 | 1/1961 | Zuhn | 123/41.77 |
| 3,127,880 | 4/1964 | Meurer et al. | 123/41.85 |

FOREIGN PATENT DOCUMENTS

2429355  1/1975  Fed. Rep. of Germany.

Primary Examiner—Charles J. Myhre
Assistant Examiner—Jeffrey L. Yates
Attorney, Agent, or Firm—Cushman, Darby & Cushman

[57] ABSTRACT

A structural unit for an internal combustion engine, including an engine region (for instance, a part of a cylinder head directly exposed to the cylinder firing zone) that requires direct cooling in use. Instead of applying the cooling to the region itself, it is applied to a separate structure with a connection to the region, the section of the connection corresponding in shape with that of the region itself. Both gaseous and liquid cooling of the structure are described.

6 Claims, 6 Drawing Figures

CYLINDER HEAD COOLING ARRANGEMENT FOR INTERNAL COMBUSTION ENGINES

This invention relates to units of structure for internal combustion engines, and in particular to regions of the engine structure that will be heated in use to such high temperatures that they require direct cooling. One typical application of the invention is thus to certain regions of the cylinder head above the surface directly exposed to the cylinder firing zones.

It is customary to cool the cylinder blocks and heads of the internal combustion engines, especially diesel engines, by means of massive cooling water jackets surrounding the block and extensive water cooling passages formed within both the head and the block. Proposals have recently been made to do away entirely with the customary jackets and to confine the passages to those regions of the structure surrounding the cylinder that are most in danger of overheating when in use. It has been found that other parts which normally run at unnecessarily low temperatures - due to the massive cooling provided by the normal jackets - are then adequately cooled by lateral flow of heat through the walls surrounding the cylinder. In many diesel engines, only those regions of the cylinder head close to the injection nozzles, the valve guides and exhaust valve seats, and the valve bridge require direct cooling; those regions of the cylinder bore walls which lie closer to the cylinder head also need direct cooling.

Although cylinder blocks and heads can be mass-produced with restricted water passages around the danger zones to provide the localised cooling just described, the machining of the passageways naturally adds to the cost of the units. Another consideration is that although the arrangements described have proved effective in controlling temperatures satisfactorily while removing less heat than normal, the control they provide over the heat removal process is far from complete. One aspect of this is that the supply and return passages, as distinct from the local cooling passages proper, extract heat from regions which it is not desired to cool directly. Yet another consideration is that it is sometimes difficult to match the shape of the cooling passages proper with the parts they are to cool directly; for instance it is often easiest to machine an annular passage but if this is applied to the structure around a fuel injection nozzle or an exhaust valve seat, where the hot zone usually lies mostly to one side of the nozzle or seat rather than the other, the annulus will extend to the other, cooler side also and will remove heat unnecessarily from that side also.

The present invention provides scope for achieving a more accurate register between a positive cooling system and the regions requiring direct cooling. The invention involves connecting the region that requires cooling to a heat-conducting structure, the connection being shaped to match the region.

The invention is defined by the claims at the end of this specification and will now be described, by way of example, with reference to the accompanying drawings in which:

Figure 1:
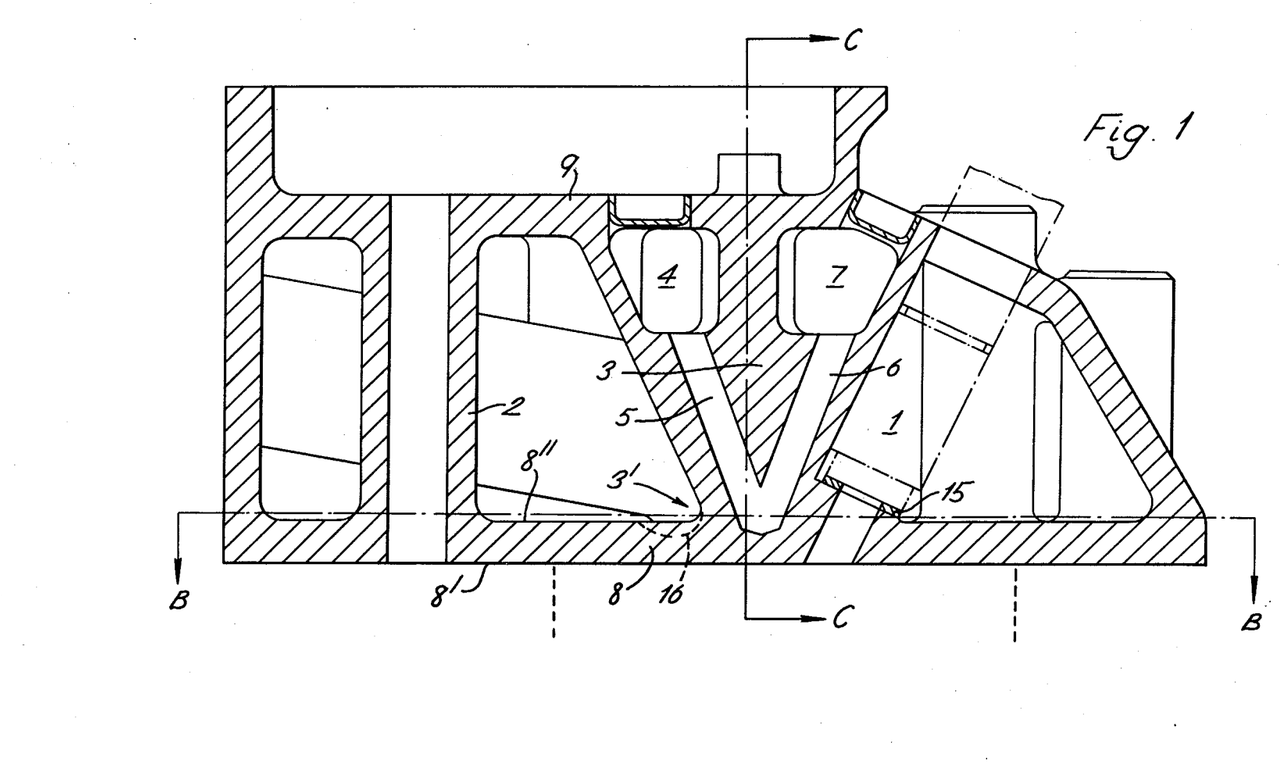
FIG. 1 is a transverse cross-section of a cylinder head of a multi-cylinder four-stroke diesel engine, on the line F—F in FIG. 2.
Figure 2:
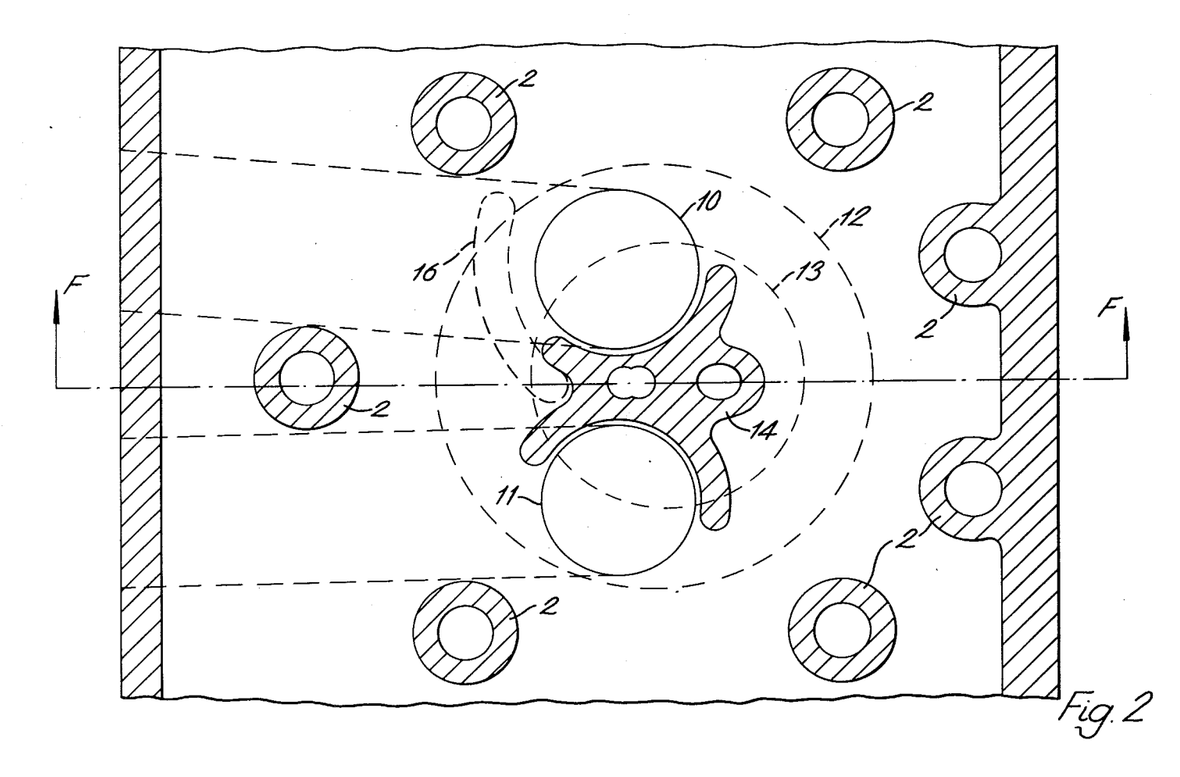
FIG. 2 is a section of the line B—B in FIG. 1.
Figure 3:
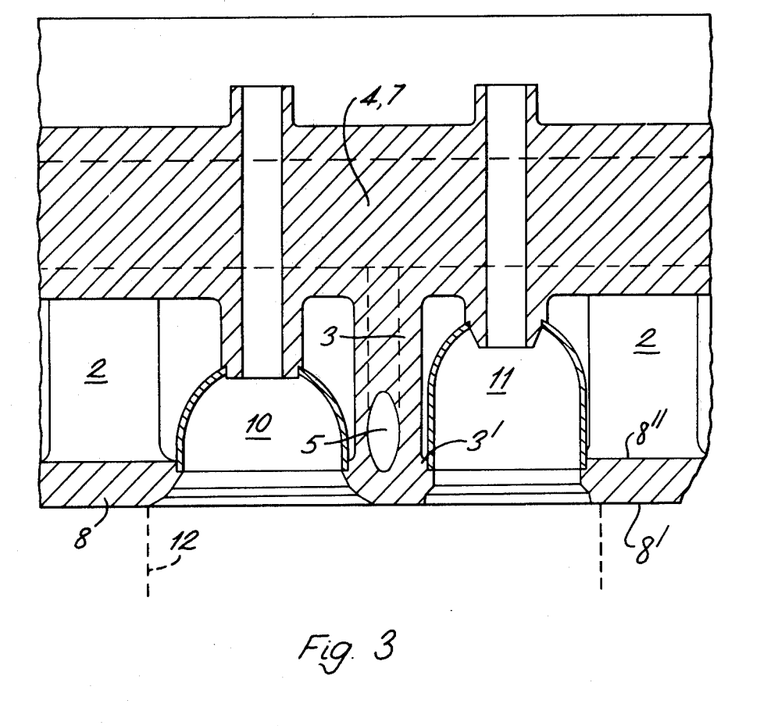
FIG. 3 is a section on the ine C—C in FIG. 1.

FIGS. 1 to 3 show an example of the engine using a liquid, namely water, as coolant. A part of the lower surface 8' of the lower deck 8 of the cylinder head appertaining to each cylinder is exposed in use to the combustion zone of that cylinder. According to the invention heat is conducted away from certain regions of the upper surface 8" by a cooled heat-conducting structure 3 through the connection region 3' in the plane BB.

The plane of the section of FIG. 1 includes the axis of the fuel injector housing 1 and is very close to the axis of a cylinder and of one of the columns 2 surrounding the several studs by which the cylinder head is attached to the cylinder block. The heat-conducting structure is maintained at relatively low temperature by a flow of water which reaches it from a pump at one end of the engine via a supply manifold 4, passes through two drilled passages 5 and 6 and returns via the return manifold 7 to the end of the engine, where it is cooled by a radiator. The water extracts heat from structure 3 via the surfaces of the two manifolds as well as via the surfaces of the passages 5 and 6 though it will be appreciated that the temperature of the lower deck 8 is much higher than that of the upper deck 9 of the head, so that the local heat transfer rates will be highest at the lower ends of the passages 5 and 6.

In FIG. 2 the air inlet port in deck 8 is seen at 10 and the air exhaust port at 11. The position of the cylinder bore in relation to the cylinder head is indicated by 12, and the position of an offset combustion chamber bowl in the piston crown is indicated by 13. It is the cylinder head surface opposite this bowl that is most intensely heated. All the stud columns 2 surrounding this cylinder are seen in section. The section B—B is taken just above deck 8 and shows the cross-section 14 of the connection region 3' between the cooled heat-conducting structure 3 and the deck. This section registers with the area of the deck that requires direct cooling to maintain satisfactory temperatures throughout the component. This area includes the bridge between the air port 10 and the exhaust port 11. It extends round most of that part of the air port 10 which lies above the combustion chamber bowl 13 and it extends somewhat further round the exhaust port because the exhaust valve seat receives more heat. The area also includes the whole of the area below the nozzle cap sealing washer 15 but it will be appreciated that the heat extracted from deck 8 on that side of the nozzle remote from the cylinder axis will be considerably less than by an annular water-cooling passage, while on the hotter side, where more effective cooling is necessary, this is provided by the flow of water in passage 6. It will be noted that the manifolds 4 and 7 fulfil an extra task of cooling the inlet and outlet valve guide housings that are situated between them.

As an example of the control of lateral heat flow to the directly-cooled region by choice of local thickness of the component, FIGS. 1 and 2 show in broken lines an optional depression 16 in the upper surface 8" of deck 8 which limits lateral flow of heat to the cooled structure 3 from that part of the deck below the air inlet passage, this being a region of the deck where in some cases the metal temperatures would otherwise be unnecessarily low.

FIG. 3 shows the part of the cylinder head covering one cylinder, in the longitudinal plane of the valve axes.

Figure 4:
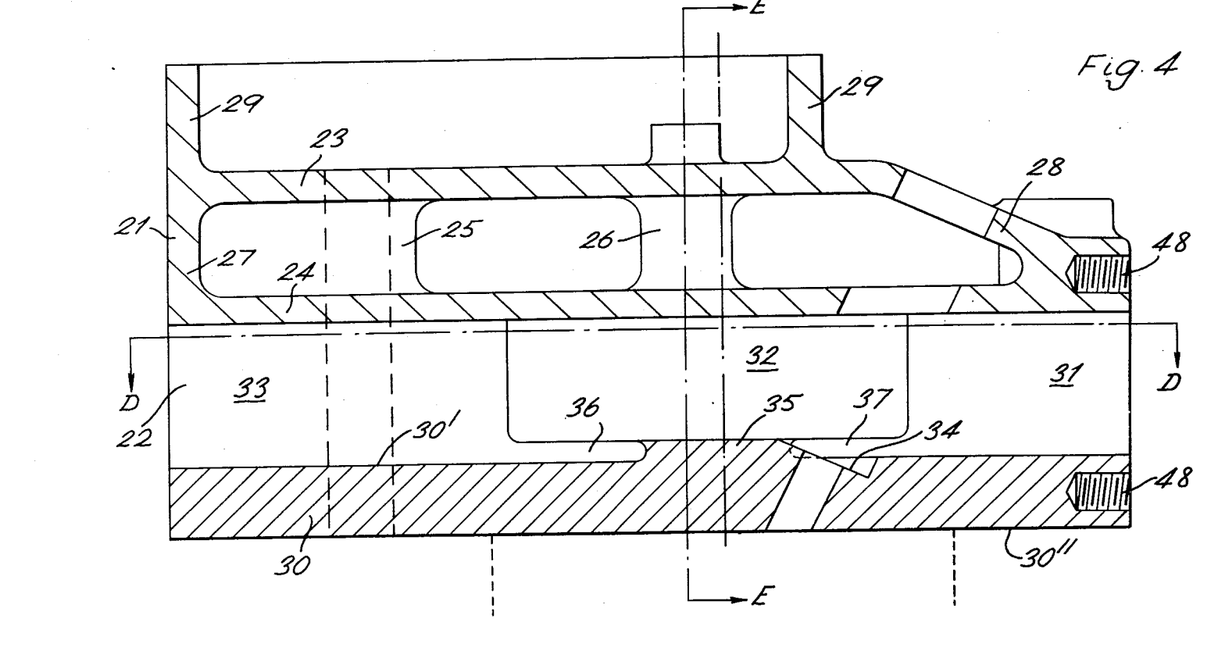
FIG. 4 is a section on the line A—A in FIG. 5.
Figure 5:
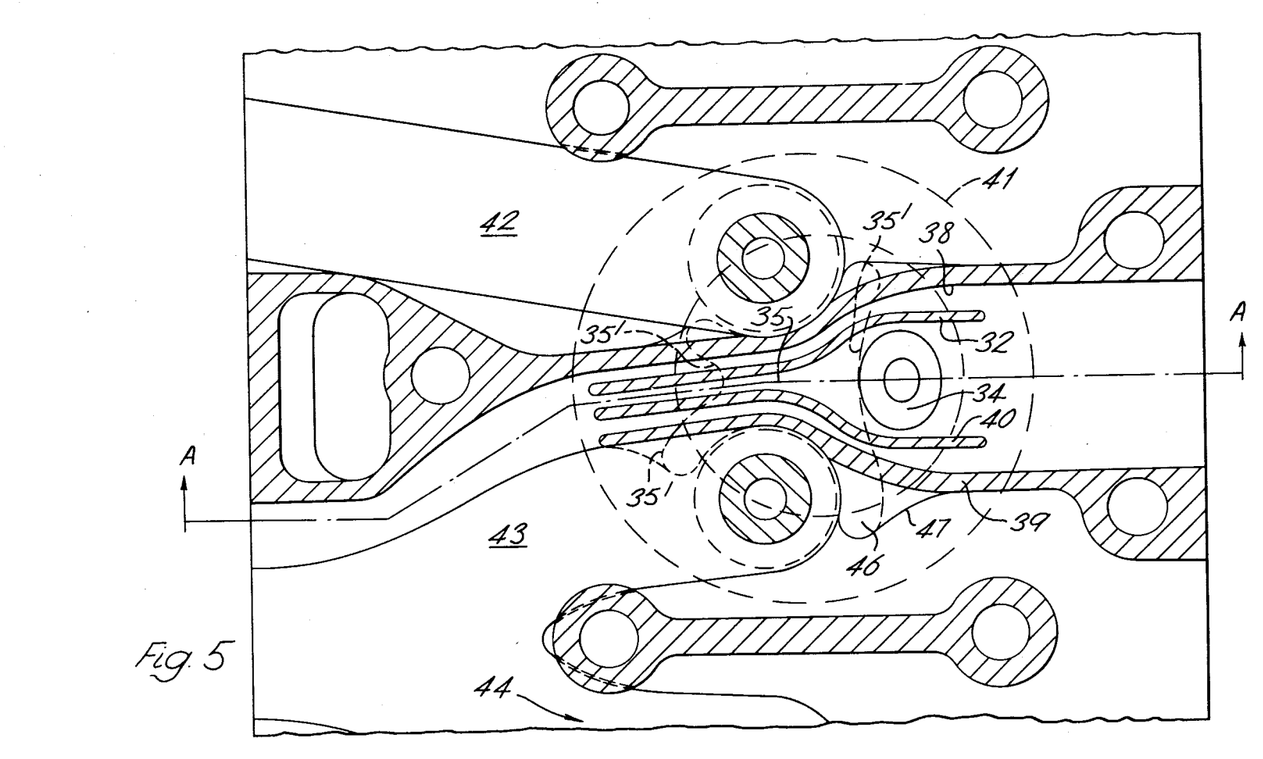
FIG. 5 is a section on the line D—D in FIG. 4.
Figure 6:
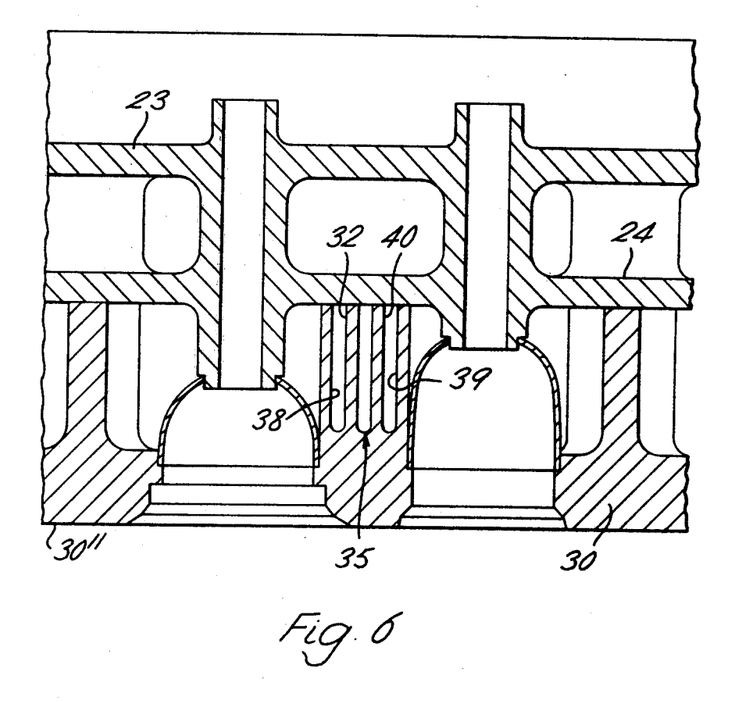
FIG. 6 is a section on the line E—E in FIG. 4.

FIGS. 4 to 6 show another example of the invention, using air as the coolant fluid. Here what requires cooling is a region of the lower deck 30 of a cylinder head consisting of an upper part 21 and a lower part 22. The heat-conducting structure includes cooling fins 32 connected to the top surface 30' of deck 30, parts of the lower surface 30" of which are exposed in use to the combustion zones of the cylinders. Part 21 comprises upper decks 23 and 24, bridged by a number of cylinder head stud columns 25 and valve guides 26, and joined by sides 27 and 28 forming a box structure with projecting walls 29 which form the lower part of an enclosure for the valve levers and associated parts. Part 22 comprises the lower deck 30 and various projections. The two parts are located in relationship to one another by dowels and are clamped together and to the cylinder clock (not shown) by the cylinder head studs and nuts. The two parts form a passage for the flow of cooling air. The passage comprises an inlet portion 31, a central portion in which are mounted the cooling fins 32, one of which is seen, and an outlet portion 33. Holes through the three decks and a seating at 34 are provided to accommodate a fuel injector. The cooling fins 32 make contact with lower deck 30 over a limited area through a connection region including the raised portion 35 of the deck, and beyond this area the fins are separated from the deck by the air gaps 36 and 37.

The area of raised portion 35 upon surface 30' of lower deck 30 registers as nearly as possible with the area of the surface region that needs direct cooling in order to maintain satisfactory temperatures throughout the component. Where it preferred to mount fins 32 directly upon surface 30', instead of directly upon the raised portion 35, the envelope of the areas of contact between all the individual fins and the surface should substantially correspond to the cross-section of portion 35.

FIG. 5 shows the configuration of the air passage walls, 38 and 39, which act also as cooling fins swept by air on one side, and of two cooling fins 32 and 40 arranged above the cylinder bore (which is indicated by the broken line 41) one on either side of the injector seating 34, and dividing the space between the walls 38 and 39 into three passages, presenting six heat exchange surfaces. Inlet cooling air approaching the fuel injector is channelled into the central passage and the remaining air passes through the outer passages. The minimum combined width of the flow passages, passage walls and fins is equal to the minimum distance between the air inlet passage 42 and the exhaust passage 43 which is "siamesed" with the similar passage 44 of the adjacent cylinder, these three passages being seen here in plan view. After passing the fins, the cooling air flows with little resistance to the outlet at the side of the cylinder head, since the outlet portion of the passage extends under the exhaust passage 43. The inlet and exhaust passages are made of heat-resistant steel. FIG. 5 shows the outline 35' and thus the extent of the area of the raised portion 35 (FIG. 4) of deck 30 constituting the link region through which direct cooling is applied. This area is similar in shape to the corresponding area requiring cooling in FIGS. 1 to 3. Cooling of the parts, such as 46, of the raised portion 35 which would otherwise project beyond the cooled passage walls is improved by locally increasing the width of the passage walls near the deck 30, as indicated for example at 47.

An air duct conveying air from a fan or other source (not shown) in known manner, and which may serve also to supply air for cooling the cylinder, is connected to the inlet portion 31 of the cylinder head air passage by means of studs mounted in tapped holes 48 (FIG. 4). After passing through the outlet portion 33 of the passage, the cooling air escapes in the normal way directly to the atmosphere.

The section of FIG. 6, which shows the part of the cylinder head covering one cylinder, is taken in the longitudinal plane of the valve axes.

It will be noted that when air is used as the coolant, the cool body (i.e. heat-conducting structure) applied to the selected areas of the deck from which heat is to be extracted comprises essentially a block of metal in which are formed air flow passages instead of the water flow passages of the water-cooling version. The cool body thus becomes a number of fins, the outer fins conveniently forming the walls of the air flow passage through the cylinder head. The main features distinguishing such an arrangement from the normal use of cooling fins in air-cooled engines are that the fins are attached to the limited selected areas corresponding with the regions to be cooled, and that their projections beyond these areas are separated from the cylinder head deck by air gaps. Another difference is that in known designs, cooling fins are placed all over the cylinder head and only a fraction of the air passes over the critical central regions, so that these critical regions are cooled largely by lateral heat flow through the deck. To maintain the critical regions at acceptable temperatures by this means, it is necessary to cool the surrounding regions to well below acceptable temperatures, thus removing heat unnecessarily.

In another alternative to the use of the raised portion 35 in FIGS. 3–6 the three air passages between the fins, best seen in FIG. 6, may be carried much lower so that in the connection region between fins and deck the thickness of the deck 30 is reduced to one half or less of that existing elsewhere, the fins and the structure of upper decks 23, 24 providing adequate support of the deck against cylinder gas pressure. The choice will depend on the extent to which the cooling effect needs to be localised in a particular application.

As an alternative to the fin design shown in FIG. 6, the fins may slope outwards to make more use of the space between the two gas passages and the two valve guides, thus providing more area for air flow. Fins may also be attached directly to the valve guides to cool them. The two-part construction facilitates casting of the fins, which would be further assisted by tapering the fins in accordance with common practice.

I claim:

1. A structural unit for an internal combustion engine comprising:
   a deck defining a cylinder cover having an extending surface and a region within said surface less in area than said extending surface, said region having a sub-surface that is heated in use so as to require direct cooling to prevent overheating of said region;
   a heat-conducting structure;
   heat-conducting connection means between said deck region and said heat-conducting structure; and
   fluid-flow cooling means associated with said heat-conducting structure, whereby to remove heat conducted to it through said heat-conducting connection means from said region of said unit, said fluid-flow cooling means providing the only direct cooling of said heat conducting structure so as to prevent overheating of said region, and in which the section through said connection means at the location between said connection means and said deck matches in shape and registers with said region requiring direct cooling to conduct heat from said region to said heat conducting structure, said region being under substantial influence from no other fluid flow cooling means.

2. A structural unit for an internal combustion engine, according to claim 1, in which said fluid-flow cooling means to cool said heat-conducting structure comprise passages for cooling fluid formed integrally within said heat-conducting structure.

3. A structural unit for an internal combustion engine, according to claim 2, in which said heat-conducting structure, said heat-conducting connection means and said region to be cooled are all formed integrally with each other.

4. A structural unit for an internal combustion engine, according to claim 1, in which:

said internal combustion engine comprises at least one cylinder and cylinder head, and said region comprises a part of said head confronting the hottest area of the firing zone of said cylinder.

5. A structural unit for an internal combustion engine, according to claim 4, in which:

said engine is a diesel engine, and said region comprises part of said cylinder head closely surrounding at least one of the following features:

a fuel injection nozzle;

inlet valve seats;

exhaust valve seats, and a 'bridge' region between said inlet and exhaust valve seats.

6. A unit as in claim 1, wherein said engine has valve seats and means for injecting fuel and wherein said region at least partially encompasses said injecting means and valve seats for cooling the same.

* * * * *

UNITED STATES PATENT AND TRADEMARK OFFICE
CERTIFICATE OF CORRECTION

PATENT NO. : 4,147,140
DATED : April 3, 1979
INVENTOR(S) : Wilfred P. MANSFIELD

It is certified that error appears in the above-identified patent and that said Letters Patent are hereby corrected as shown below:

In the Heading:

Please add:

-- [30] Foreign Application Priority Data

June 22, 1976    United Kingdom ...25901/76 --

Signed and Sealed this

Ninth Day of October 1979

[SEAL]

Attest:

RUTH C. MASON
Attesting Officer

LUTRELLE F. PARKER
Acting Commissioner of Patents and Trademarks